April 24, 1934.  J. G. SWAIN  1,956,428
DUAL WHEEL AND DEMOUNTABLE RIM
Filed Feb. 16, 1927  2 Sheets-Sheet 1
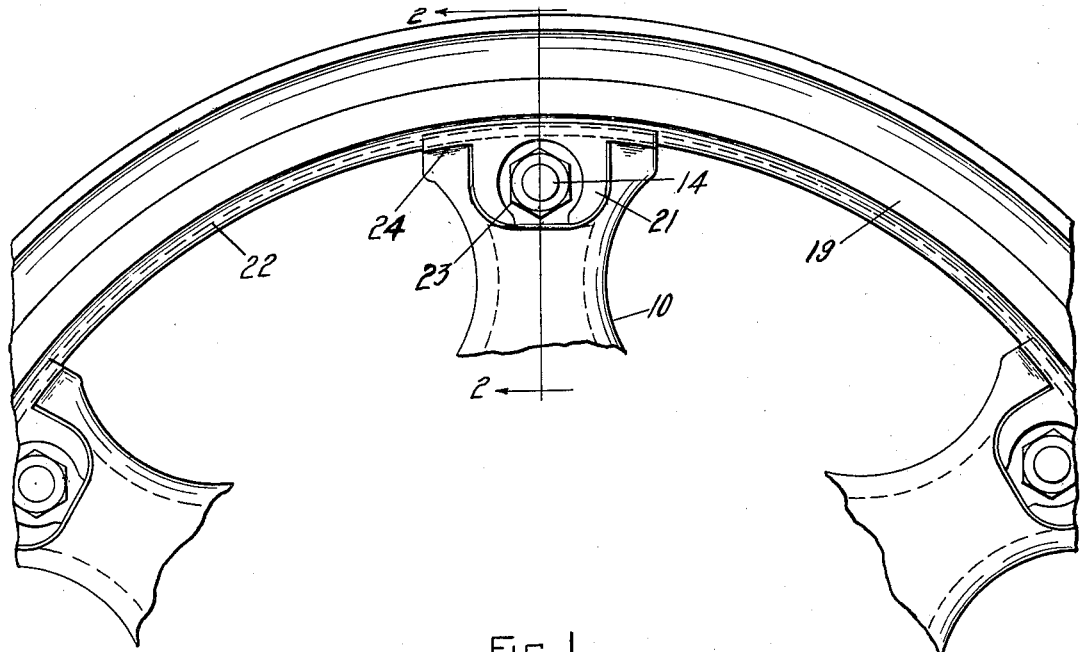
FIG_1_
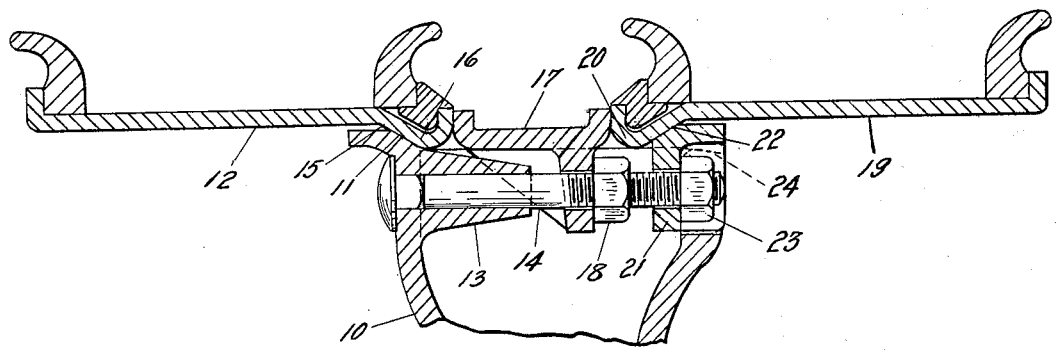
FIG_2_
INVENTOR.
JOSEPH G_SWAIN_
BY
ATTORNEY.

Patented Apr. 24, 1934

1,956,428

UNITED STATES PATENT OFFICE 1,956,428

DUAL WHEEL AND DEMOUNTABLE RIM

Joseph G. Swain, Akron, Ohio, assignor to The Firestone Steel Products Company, Akron, Ohio, a corporation of Ohio Application February 16, 1927, Serial No. 168,552

1 Claim. (Cl. 301—13)

This invention relates to dual wheels and demountable rim equipment therefor.

One object of the invention is to provide a dual or twin tire construction for fellyless automobile wheels. Another object is to provide separate securing means on the same bolt for attaching the inner and outer rims, the securing means for the inner rim serving also as a spacer for maintaining a fixed distance between the inner and outer rims. A further object is to provide means on the spokes of the wheel for holding the attaching bolts in proper alignment.

Another object of the invention is to adapt the construction to both a plain demountable rim and an attached lug demountable rim.

The foregoing and other objects are attained by the construction shown in the accompanying drawings and described below. It is to be understood that the invention is not limited to the specific form thereof shown and described.

Of the accompanying drawings:

Figure 1 is a side elevation partly broken away, of a wheel and rim construction embodying the principles of the invention;

Figure 2 is a radial section taken on the line 2—2 of Figure 1;

Figure 3:
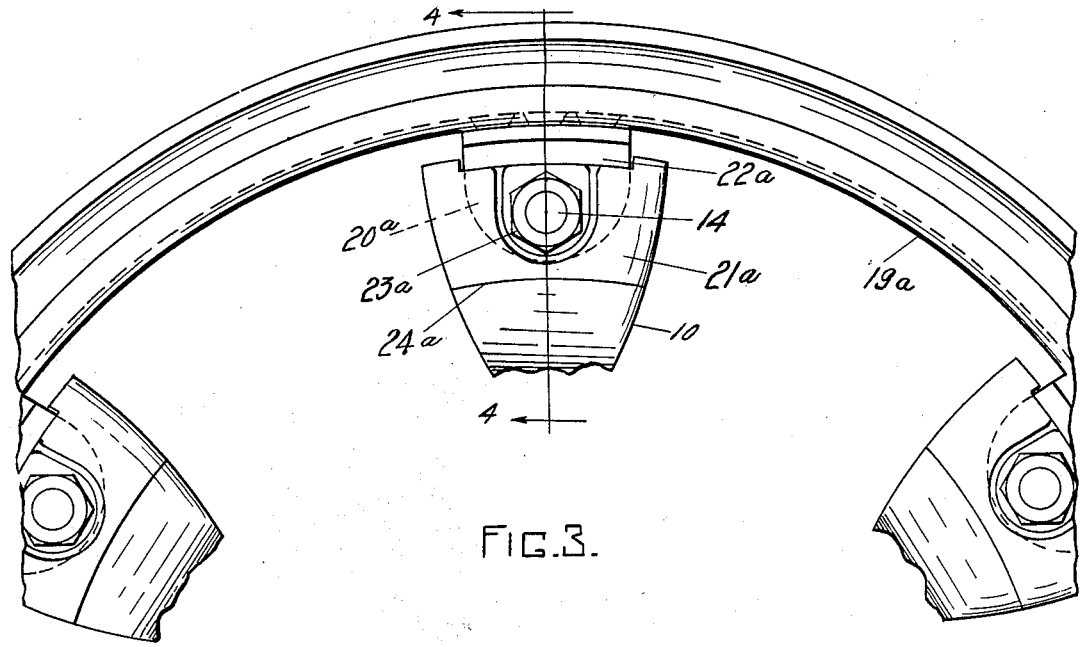
Figure 3 is a side elevation partly broken away, of a modified form of the invention.

Referring more particularly to the drawings, the hollow spokes 10 of a metallic fellyless wheel are provided on the inner side of their radially outward ends with a beveled seat 11 for carrying an inner rim 12 and an internal boss 13 for holding a bolt 14 in correct alignment in the end of the spoke. A suitable driver (not shown) can be placed in the gutter of each rim, or a lug riveted at the proper location, to prevent circumferential movement of the rim on the wheel structure.

In the form of the invention illustrated in Figures 1 and 2, rim 12 is mounted on spokes 10 with the beveled surface 15 of the gutter 16 of the rim wedged against beveled seat 11 and secured in position by clamp members 17 and nuts 18 threaded on bolts 14. Clamp members 17 also serve as spacers and maintain a fixed distance between the inner rim 12 and the outer rim 19. The outer rim 19 is mounted with its gutter 20 in engagement with clamp members 17 and is secured on the wheel by means of wedge clamps 21 forced against the beveled surface 22 of gutter 20 by nuts 23 threaded on bolts 14. Wedge clamps 21 are also wedged against seats 24 on the outer side of the spoke ends, thus transmitting the load from rim 19 to the spokes.

Figure 4:
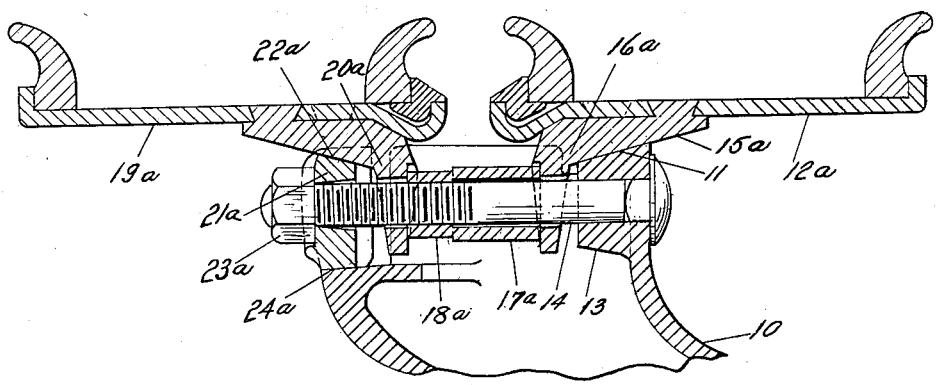
Figure 4 is a radial section taken on the line 4—4 of Figure 3.

In the form of the invention illustrated in Figures 3 and 4, inner rim $12^a$ is mounted on spokes 10 with the beveled surface $15^a$ of the attached lug $16^a$ of the rim wedged against beveled seat 11 and secured in position by clamping sleeves $17^a$ and integral nut portions $18^a$ threaded on bolts 14. In this construction, clamping sleeves $17^a$ also serve as spacers to maintain a fixed distance between the inner rim $12^a$ and the outer rim $19^a$. The outer rim $19^a$ is mounted with its attached lugs $20^a$ in engagement with clamping sleeves $17^a$ and is secured on the wheel by means of wedge clamps $21^a$ forced against the beveled surface $22^a$ of lugs $20^a$ by nuts $23^a$ threaded on bolts 14. Wedge clamps $21^a$ are also wedged against seats $24^a$ on the outer side of the spoke ends, thus transmitting the load from rim $19^a$ to the spokes.

It will be seen that the invention may thus be embodied in constructions including either the plain demountable rim or the attached lug demountable rim.

Further modifications of the invention may be resorted to without departing from the spirit thereof or the scope of the appended claim.

What is claimed is:

A dual wheel and demountable rim structure comprising, a wheel having a beveled seat and a perforate boss on the inner side of each of its spoke ends, a bolt mounted in each of said spoke ends and held in axial alignment by said boss, an inner rim mounted on the spokes and having a beveled surface adapted to wedge against the beveled seats thereon, clamp members positioned on said bolts for securing the inner rim on the wheel, said members serving also as spacers to maintain a fixed distance between said inner rim and an outer rim, an outer rim mounted on the wheel in engagement with said clamp members and having a beveled mounting surface, seats on the outer side of the spoke ends, and wedge clamps positioned on said bolts and wedged into engagement with the last-named beveled mounting surface and seats to secure the outer rim on the wheel.

JOSEPH G. SWAIN.